(12) United States Patent
Geisel

(10) Patent No.: US 11,363,806 B1
(45) Date of Patent: Jun. 21, 2022

(54) FISHING REEL WITH BRAKING ASSEMBLY

(71) Applicant: ALLEN FLY FISHING, LLC, Southlake, TX (US)

(72) Inventor: Justin Allen Geisel, Haslett, MI (US)

(73) Assignee: ALLEN FLY FISHING, LLC, Southlake, TX (US)

(*) Notice: Subject to any disclaimer, the term of this patent is extended or adjusted under 35 U.S.C. 154(b) by 0 days.

(21) Appl. No.: 17/107,028

(22) Filed: Nov. 30, 2020

(51) Int. Cl.
*A01K 89/01* (2006.01)
*A01K 89/033* (2006.01)
*A01K 89/00* (2006.01)
*A01K 89/015* (2006.01)

(52) U.S. Cl.
CPC .......... *A01K 89/033* (2013.01); *A01K 89/006* (2013.01); *A01K 89/0192* (2015.05)

(58) Field of Classification Search
CPC .......... A01K 89/01555; A01K 89/0155; A01K 89/033; A01K 89/01923
See application file for complete search history.

(56) References Cited

U.S. PATENT DOCUMENTS

| | | | | |
|---|---|---|---|---|
| 4,830,308 A | * | 5/1989 | Puryear | A01K 89/01555 242/288 |
| 5,556,048 A | * | 9/1996 | Hashimoto | A01K 89/01555 242/288 |
| 5,692,693 A | * | 12/1997 | Yamaguchi | A01K 89/01555 242/288 |
| 5,743,479 A | * | 4/1998 | Miyazaki | A01K 89/01923 242/312 |
| 5,839,682 A | * | 11/1998 | Kim | A01K 89/015 242/314 |
| 5,855,331 A | * | 1/1999 | Morimoto | A01K 89/01555 242/310 |
| 5,873,535 A | * | 2/1999 | Jeung | A01K 89/015 242/314 |
| 6,065,700 A | | 5/2000 | Kim | |
| 6,209,816 B1 | * | 4/2001 | Hitomi | C23F 15/00 242/322 |
| 6,908,054 B1 | | 6/2005 | Kim et al. | |
| 7,618,003 B2 | | 11/2009 | Rho | |
| 7,717,366 B2 | | 5/2010 | Alajajyan | |
| 8,967,517 B2 | | 3/2015 | Ikebukuro | |
| 9,999,210 B1 | * | 6/2018 | Kim | A01K 89/056 |
| 2002/0063181 A1 | * | 5/2002 | Yamaguchi | A01K 89/05 242/286 |
| 2004/0159731 A1 | * | 8/2004 | Moosberg | A01K 89/01555 242/288 |
| 2009/0026300 A1 | * | 1/2009 | Tsutsumi | A01K 89/01555 242/288 |

(Continued)

*Primary Examiner* — Emmanuel M Marcelo
(74) *Attorney, Agent, or Firm* — Duane Morris LLP

(57) ABSTRACT

A fishing reel can include a cage assembly defining an opening to removably receive a spool and a spool positioned in the cage assembly operable to rotate about an axis of rotation. The reel can also include a crank coupled to the cage assembly and operable to rotate the spool when the crank is rotated. The reel can also include a braking assembly removably positioned on a side of the cage assembly opposite to the crank, the braking assembly including at least one magnet, the magnet having an arcuate shape that spans a braking arc length concentric with the axis of rotation, the braking arc length defined by an arc measure of at least about 90°.

16 Claims, 7 Drawing Sheets

(56) References Cited

U.S. PATENT DOCUMENTS

| | | | |
|---|---|---|---|
| 2012/0056029 A1* | 3/2012 | Sim | A01K 89/0155 |
| | | | 242/273 |
| 2013/0320125 A1* | 12/2013 | Hyun | A01K 89/01923 |
| | | | 242/312 |
| 2014/0110517 A1 | 4/2014 | Niitsuma | |
| 2016/0345562 A1* | 12/2016 | Baldwin | A01K 89/01922 |
| 2017/0196211 A1* | 7/2017 | Umezawa | A01K 89/006 |
| 2017/0208789 A1* | 7/2017 | Numata | H02K 7/1861 |
| 2017/0339935 A1* | 11/2017 | Toake | A01K 89/056 |
| 2017/0354133 A1* | 12/2017 | Hyun | A01K 89/01555 |

* cited by examiner

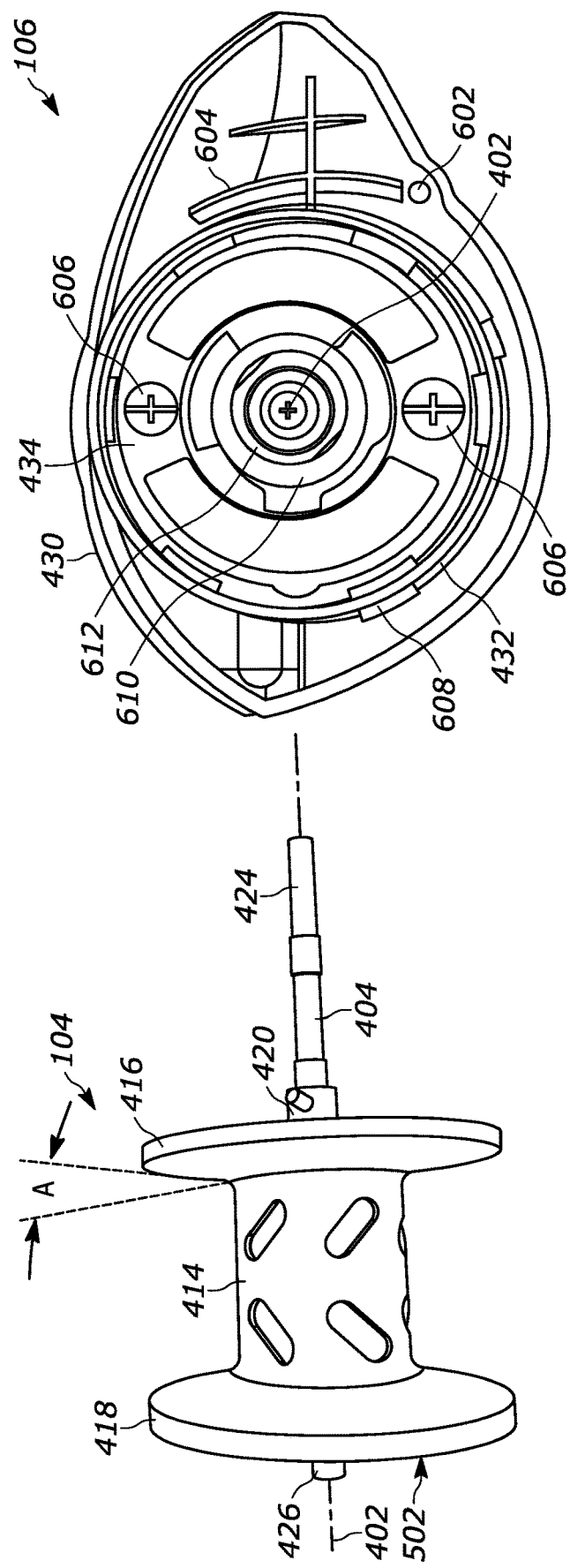

FISHING REEL WITH BRAKING ASSEMBLY

FIELD

The present disclosure relates to fishing reels and more particularly, to fishing reels with braking assemblies.

BACKGROUND

This section provides background information related to the present disclosure which is not necessarily prior art.

Fishing reels typically include a length of fishing line that is wrapped around a spool or other spinning element. The length of fishing line can be extended from the spool when the line is thrown or cast to deliver a fishing lure, bait, hook or other attachment to a desired location. When the line is cast, the spool spins to release the length of line from the fishing reel. The spool can then be rotated in a reverse rotational direction to retrieve the length of line that becomes extended from the reel during the casting process. While the fishing line extends from the reel during the casting process, various problems can occur that can cause the fishing line to become tangled and/or to cause the reel to restrict the release of the fishing line from the reel.

There exists a need, therefore, for improved reels that eliminate or reduce the likelihood that the fishing line will encounter issues while casting. Such improved reels can limit the likelihood that fishing line will tangle when it is casted and can reduce the likelihood that the fishing line will be restricted from release while casting. Such improvement can improve the repeatability of satisfactory casts, improve casting distance and improve casting accuracy.

SUMMARY

This section provides a general summary of the disclosure, and is not a comprehensive disclosure of its full scope or all of its features.

In some embodiments of the present disclosure a fishing reel can include a spool positioned within a cage assembly that is operable to hold a length of fishing line. When a user of the fishing reel executes a cast to direct a fishing lure or other fishing attractor to a desired fishing location, the spool can rotate allowing the fishing line to extend from the lure with the fishing lure. To prevent the fishing line from rotating too quickly or at a rotational velocity greater than the velocity of the fishing lure and fishing line, the fishing reel can include a brake assembly operably connected to the fishing reel adjacent to the spool. The brake assembly can include an arcuate magnet that can exert a brake force on the spool when it rotates relative to the magnet to slow the rotational velocity of the spool. In this manner, the brake assembly can be adjusted to vary the brake force on the spool depending on various characteristics including the type of fishing line, the weight of the fishing line, the type of fishing lure and the weight of the fishing lure. The brake assembly can minimize and/or prevent backlash from occurring in which the fishing line can become tangled or collected in or around the fishing reel.

In some embodiments in accordance with the present disclosure, a fishing reel can include a cage assembly defining an opening and a spool positioned in the opening of the cage assembly operable to rotate about an axis of rotation. The reel can also include a crank coupled to the cage assembly and operable to rotate the spool when the crank is rotated. The reel can also include a braking assembly removably positioned on a side of the cage assembly opposite to the crank wherein the braking assembly includes at least one magnet. The magnet can have an arcuate shape that spans a braking arc length concentric with the axis of rotation wherein the braking arc length is defined by an arc measure of at least about 90°.

In one aspect, the spool can include a brake engagement surface oriented substantially perpendicular to the axis of rotation of the spool and located on a side of the spool away from the crank and adjacent to the braking assembly. The rotation of the spool can be slowed by a braking force induced on the brake engagement surface by the magnet in the braking assembly when the spool rotates about the axis of rotation.

In another aspect, the magnet can be a single continuous member.

In another aspect, the magnet can include at least one positive magnetic pole and at least one negative magnetic pole on a side of the magnet facing the spool.

In another aspect, the braking assembly can include at least two magnets, each magnet having an arcuate shape that spans a braking arc length concentric with the axis of rotation, and each braking arc length is defined by an arc measure of at least about 90°.

In another aspect, the spool can include an aluminum material surface that is engaged by a braking force exerted on the aluminum material surface when the spool rotates relative to the magnet.

In another aspect, the braking assembly can include a brake control. The brake control can include a cam that is configured to move the magnet axially toward and away from the spool along the axis of rotation.

In another aspect, the cage assembly can include a latch operable in a locked mode and an unlocked mode. The locked mode prevents removal of the braking assembly from the cage assembly and the unlocked mode allows removal of the braking assembly from the cage assembly. The latch can be configured to manually move from the locked mode to the unlocked mode without a tool.

In another aspect, the braking assembly can include a spool support configured to support an end of the spool and to locate the spool concentrically with respect to the magnet.

In another aspect, the magnet can include at least four magnetic poles distributed evenly along the braking arc length.

In another aspect, the braking arc length is defined by an arc measure of at least about 120°.

In another aspect, the braking arc length is defined by an arc measure of about 130°.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a top view of an example spool of the reel of FIG. 1.

FIG. 6 is a view of an example end cap assembly that can include one or more elements of an example braking assembly in accordance with the present disclosure.

Corresponding reference numerals indicate corresponding parts throughout the several views of the drawings.

DETAILED DESCRIPTION

Figure 1:
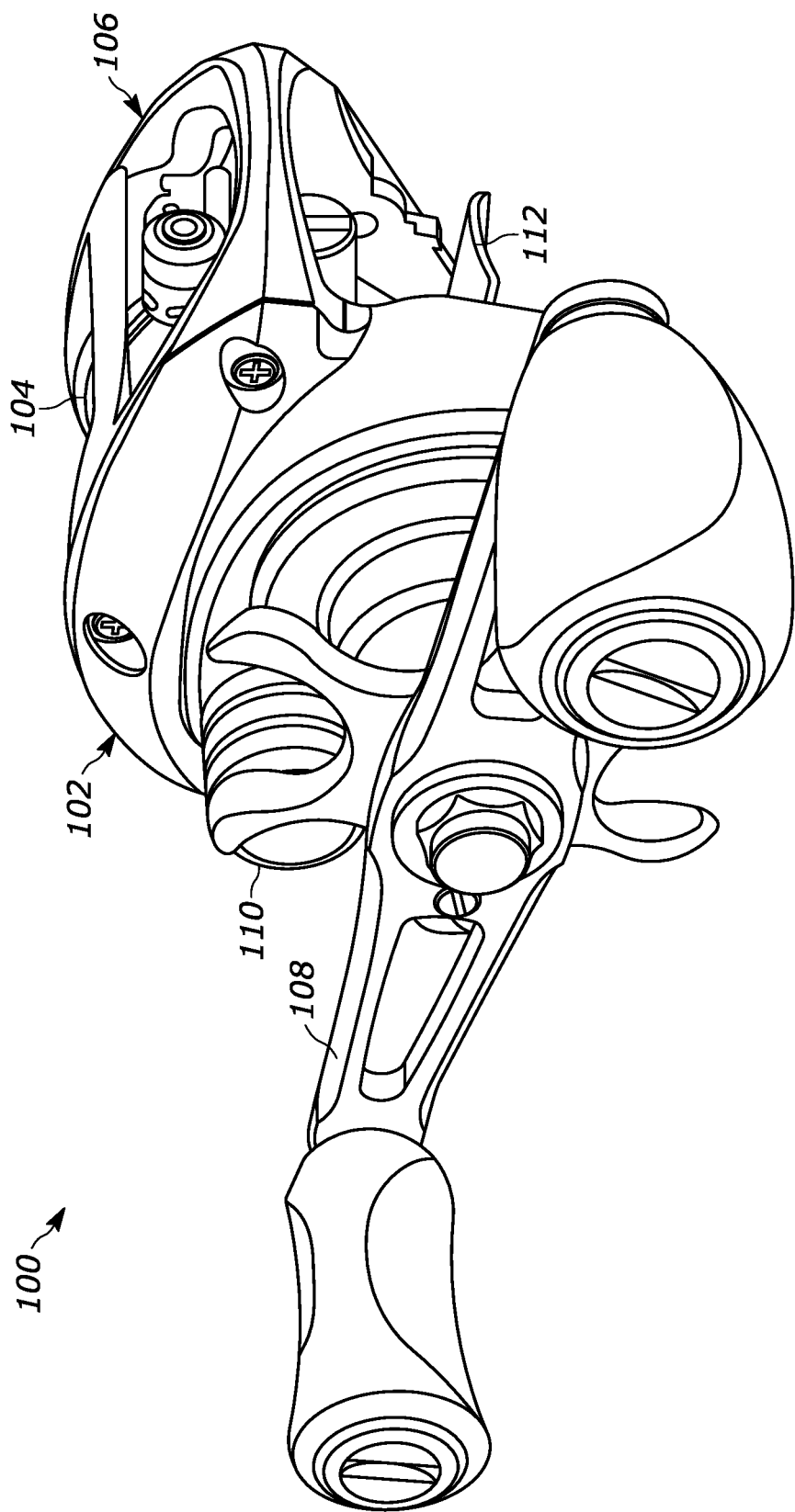
FIG. 1 is an isometric view of an example reel of the present disclosure.

Example embodiments will now be described more fully with reference to the accompanying drawings. For purposes of the description hereinafter, it is to be understood that the embodiments described below may assume alternative variations and embodiments. It is also to be understood that the specific articles, compositions, and/or processes described herein are exemplary and should not be considered as limiting. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

The fishing reel of the present disclosure can include a braking assembly that operates to slow the rotational velocity of the spool in order to prevent the spool from rotating more quickly than the fishing line can be casted from the fishing reel. Such operation can prevent the fishing line from becoming tangled in the fishing reel during casting. This issue is sometimes termed as backlash. Backlash can occur, for example, when the lure at the end of fishing line is traveling at a lower velocity than the spool is turning. In such instances, the spool is rotating more quickly than the line is moving out of the reel and the fishing line can become knotted, tangled or otherwise collected in the reel. Backlash is undesirable because it can be difficult and time-consuming to untangle and remove the fishing line that has collected in the reel.

In some examples of the present disclosure, the braking assembly can be adjustable to change a braking force that is exerted on the reel during casting. The braking assembly can be adjusted without the need to open, disassemble and/or without the need for tools or accessories. In one example, the braking assembly can include a magnet that can be moved in a magnet assembly relative to the spool. The relative movement of the magnet relative to the spool can be used to variably adjust a braking force that is exerted on the spool during casting. The magnet can have an arcuate shape such that the magnet follows a radial path relative to an axis of rotation of the spool. The magnet can include one or more magnet poles along a continuous surface of the magnet. The magnet can be positioned substantially parallel to an end surface of the spool and substantially perpendicular to the axis of rotation. When the spool spins in the cage assembly of the reel, the relative motion can exert a force against the spool slowing its rotational velocity.

Figure 2:
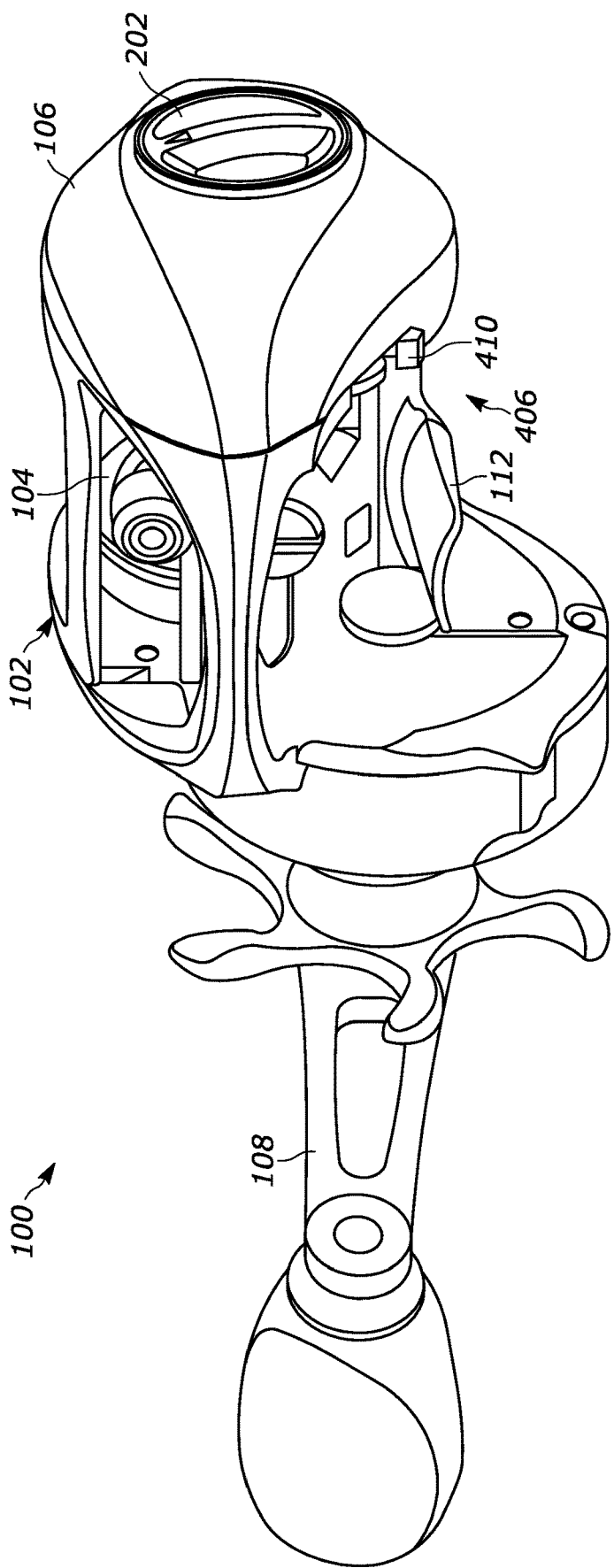
FIG. 2 is another isometric view of the example reel of FIG. 1.
Figure 3:
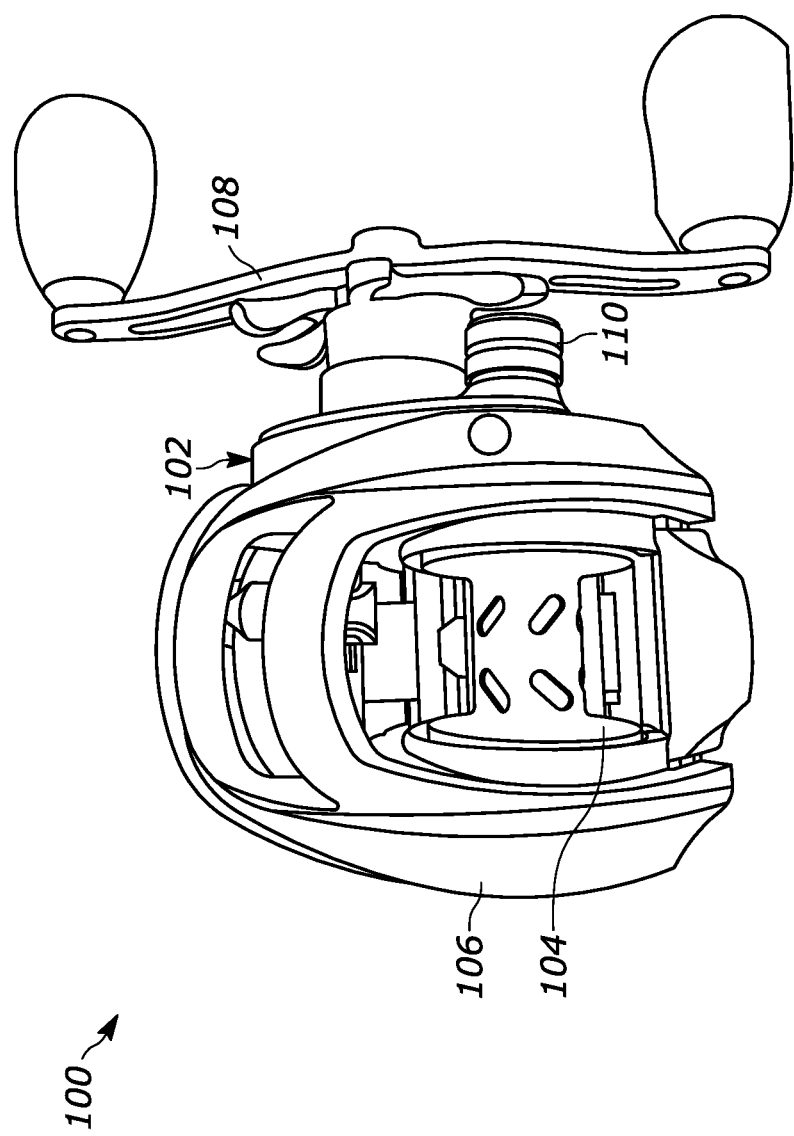
FIG. 3 is a top view of the example reel of FIG. 1.

Referring now to FIGS. 1-3, an example reel 100 is shown. The reel 100, in this example, includes a cage assembly 102, a spool 104, an end cap assembly 106 and a crank assembly 108. In operation, the reel 100 can include a length of fishing line (not shown) than can be collected around the spool 104. The reel 100 can also be coupled to a fishing rod (not shown) using the rod seat 112 that provides a surface that can rest on the rod and be coupled to the rod using an attachment ring or other coupler. When the fishing line is cast from the reel 100, the fishing line can extend from the reel 100 as the spool 104 spins to release the fishing line. The fishing line can then be retrieved and collected back onto the spool 104 by turning the crank assembly 108.

As further shown, the reel 100 can include a clutch adjuster 110. In the example shown, the clutch adjuster 110 is a knob that can be turned to change a clutch force that can be exerted against the shaft 404 (FIG. 4) of the spool 104. In other examples, the clutch adjuster 110 can have different shapes and/or configurations. The clutch adjuster 110 operates in connection with a clutch assembly that is positioned internally in the cage assembly 102. In the example shown, the clutch assembly and the clutch adjuster 110 are positioned on a side of the cage assembly 102 that is opposite to the end cap assembly 106. In this configuration, the clutch assembly can operate to exert a clutch force on one side of the spool 104 (e.g., the side of the spool 104 that includes the shaft 404 extending therefrom) and resist and/or slow the rotational speed of the spool 104.

The clutch assembly can also operate to variably control the drag of the reel. The clutch assembly, for example, can include one or more clutch discs or friction elements that rotate relative to one another when a certain pull force is exerted on the spool 104. The clutch adjuster 110 can change the required pull force that can overcome the frictional force between the friction elements. In this manner, a user of the reel 100 can change the drag of the reel 100 to try and prevent the fishing line from being broken when a fish has been hooked during fishing. Instead of breaking, the fish can pull more fishing line from the spool 104 when the fish pulls with sufficient force to overcome the frictional force of the clutch assembly. The clutch assembly also can be adjusted so as to allow the crank assembly 108 to be turned to retrieve the fishing line onto the spool when a fish is hooked at the distal end of the fishing line.

As shown, the reel 100 can also include the end cap assembly 106 positioned on a side of the cage assembly 102 opposite to the clutch adjuster 110 (and the clutch assembly). The end cap assembly 106 can include a brake assembly that can operate to adjustably slow or limit the rotational speed of the spool 104. The end cap assembly 106 can be removable from the cage assembly 104. The cage assembly can include, for example, a latch 406 (FIG. 4) that can toggle between a locked mode and an unlocked mode. In the locked mode, the latch 406 can hold the end cap assembly in a seated position on the cage assembly 104. In the unlocked mode, the end cap assembly 106 can be removed from the cage assembly 102. The latch 406, in this example, permits the latch to be moved from the locked mode to the unlocked mode without the need for a separate tool such as a coin, screwdriver, key or the like. The latch 406 can include a tab 410 (FIG. 2) that can extend below the end cap assembly 106 that can be moved from the locked mode to the unlocked mode by the user using his or her finger. When the tab 410 is moved, the latch 406 can rotate and a retention collar 408 that is located on the latch 406 can rotate to allow a locking post 602 (FIG. 6) on the end cap assembly 106 to disengage from the collar 408 of the latch 406. In other examples, other types of latches and/or locking mechanisms can be used such as set screws, twist locks, locking pins, and the like.

Figure 4:
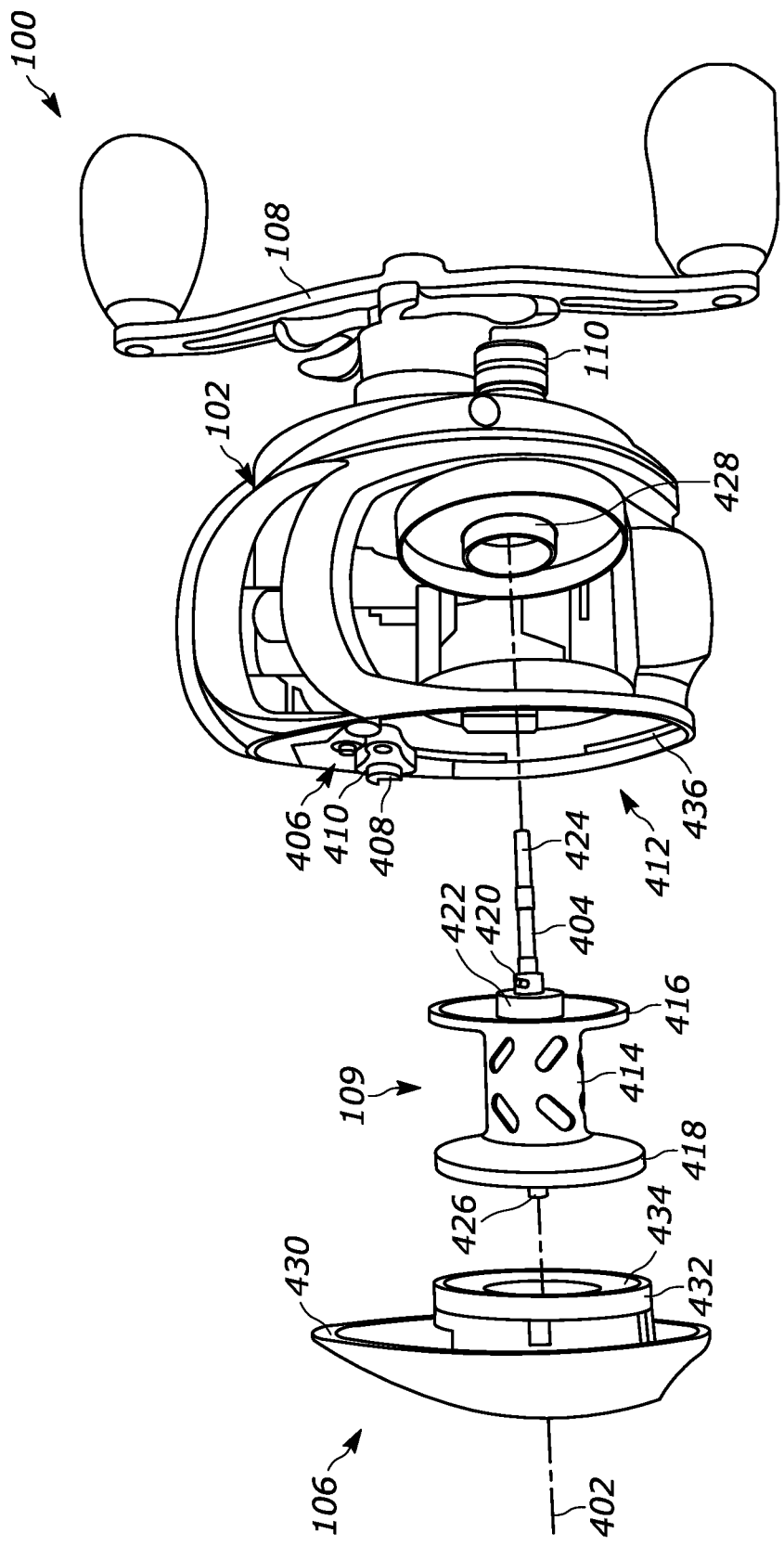
FIG. 4 is a partially exploded top view of the example reel of FIG. 3.

As shown in FIG. 4, when the end cap assembly 106 is removed from the cage assembly 106, the spool 104 can be removed from the cage assembly 106. The cage assembly 106 can define an opening 412 that allows the spool to be inserted and captured in the cage assembly 106. The spool 104 can include a shaft 404 that includes a clutch end 424 and a brake end 426. The clutch end 424 can be the end of the shaft 404 that is located proximate the clutch assembly that is included in the cage assembly on the side that includes the crank assembly 108. The brake end 426 of the shaft 404 can be the end of the shaft that is located proximate the brake assembly that is included in the end cap assembly 106. When the fishing reel 100 is fully assembled, the spool is supported by the shaft 404 in the cage assembly 106 with the shaft substantially aligned along an axis of rotation 402.

The spool 104 can further include a spline 420 that mates with and engages a complimentary spline (not shown) that is coupled to the crank assembly 108 and/or the clutch assembly. The spline 420, in the example shown, includes two posts that radially extend from the shaft 404. The posts can engage slots in the complimentary spline. Thus, when the complimentary spline is rotated, the spline 420 is engaged to cause the spool to rotate. In other examples, other types of splines or rotational members can be used to cause the spool 104 to rotate when the spool 104 is assembled into the cage assembly 102. The spool 104 can also include a bearing 422 that is located on the shaft 404. The bearing 422 can seat into a collet 428 that is located in the cage assembly 102.

The brake end 426, in the example shown, is supported in the end cap assembly 106. The end cap assembly 106 can include an aperture and/or a bearing, as will be further described, to support the spool 104 at or near the brake end 426 when the spool 104 is assembled into the fishing reel 100.

The spool 104 can include a collection portion 414, a first end portion 416 and a second end portion 418. The collection portion 414 can be located between the first end portion 416 and the second end portion 418. The collection portion 414 can have a diameter that is less than the diameter of the first end portion 416 and the second end portion 418. In this manner, fishing line can be wrapped around the collection portion 414 and be retained on the spool 104 between the first end portion 416 and the second end portion 418. As shown, the first end portion 416 and the second end portion 418 can be flanged structures that are oriented substantially perpendicular to the axis of rotation 404. In some examples, the first end portion 416 and the second end portion 418 can be angled relative to the axis of rotation 404. For example, the inner surface of the first end portion 416 and the second end portion 418 can be sloped toward the collection portion 414 such that the fishing line is guided toward the collection portion 414 when the fishing line is reeled onto the spool 104. The outer surfaces (i.e., the surface of the first end portion 416 facing the collet 428 and the surface of the second end portion 418 facing the end cap assembly 106) of the first end portion 416 and the second end portion 418 can also be angled in a similar manner. The first end portion 416 and the second portion 418 can be angled at any suitable angle A (FIG. 5) relative to the collection portion 414. In one example, the angle A of the first end portion 416 (and the second end portion 418) can be in the range of about 0° to about 15°. In other examples, the angle A can in the range of about 5° to about 10°. In still other examples, the angle A can be any other angle less than or equal to about 20°.

The spool 104 can be made of any suitable material. In one example, the shaft 404 can be machined from a stainless steel material or other suitable metal, alloy or composite. The collection portion 414, the first end portion 416 and the second end portion 418 of the spool 104 can be made from a different material than the shaft 404. In one example, the collection portion 414, the first end portion 416 and the second end portion 418 can be made of an aluminum material. In other examples, the spool 104 can include a disc of material positioned on the second end portion 418. The disc of material can be a material that is different or the same material as the second end portion 418. In still other examples, other materials can be used.

As further shown in FIG. 4, the end cap assembly 106 can include a shell 430, a brake insert 432 and a magnet 434. As will be further described, the brake insert 432 can be adjustably moved toward and away from the spool 104 when the fishing reel 100 is fully assembled. The brake insert 432 can include the magnet 434 that is positioned therein. Thus, the magnet 434 can also move toward and away from the spool 104 when the fishing reel 100 is fully assembled. The magnet 434 can exert a braking force on the second end portion 418 of the spool 104 when the spool 104 rotates in the fishing reel. In this manner, the rotational velocity of the spool 104 can be slowed during casting to assist in preventing backlash.

The magnet 434 can be positioned adjacent a braking surface 502 of the spool 104. In the example shown, the braking surface 502 is a surface of the second end portion 418 that faces the magnet 434 when the fishing reel 100 is assembled. As such, the braking surface 502 can be oriented substantially perpendicularly to the axis of rotation 402. In other examples, the braking surface 502 can be oriented at the angle A as previously described. The braking surface 502 is positioned adjacent to and/or facing the magnet 434. In this manner, the amount of surface area of magnet 434 that faces the braking surface 502 is not varied during operation. Instead, a distance between the face of the magnet 434 and the braking surface (as measured in a direction substantially parallel to the axis of rotation 402) is varied to vary the braking force exerted on the spool 104.

Figure 7:
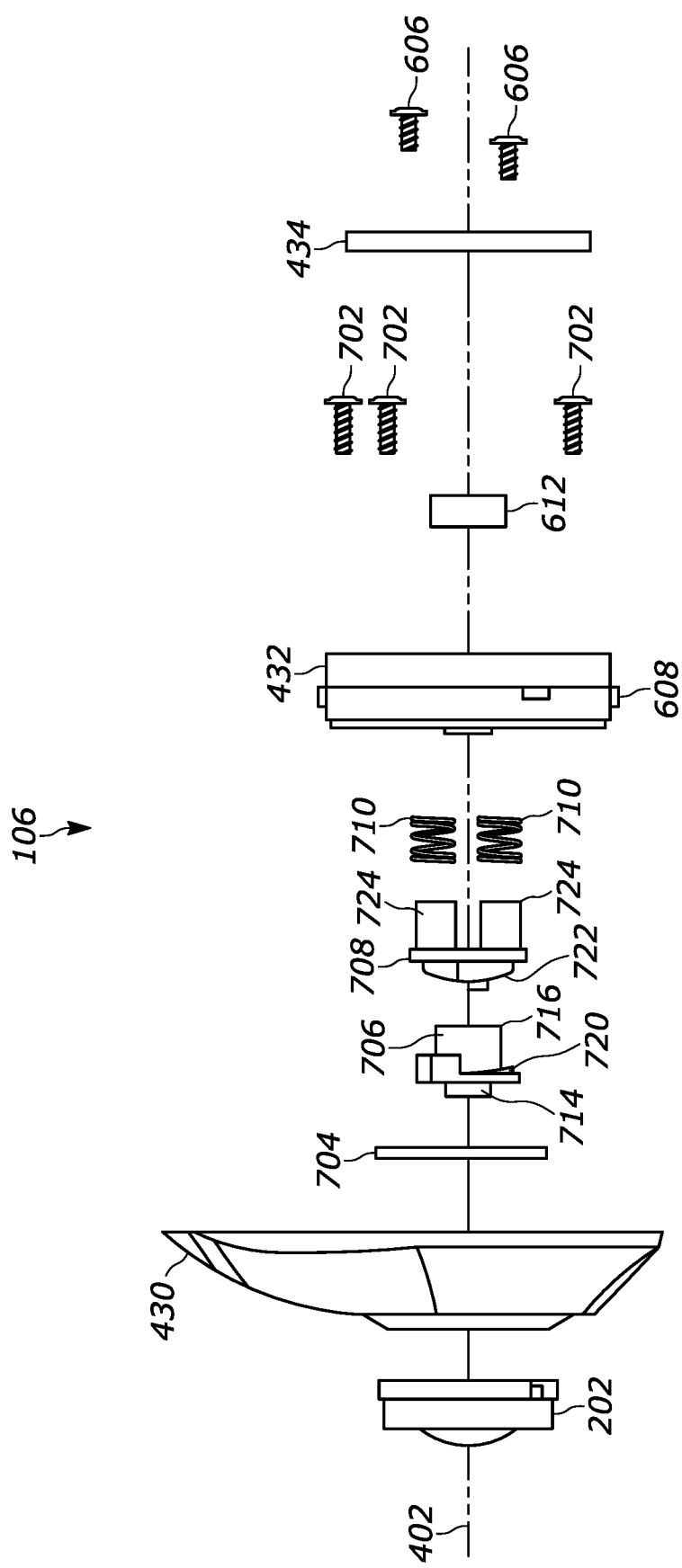
FIG. 7 is a partially exploded view of the end cap assembly of FIG. 6.
Figure 9:
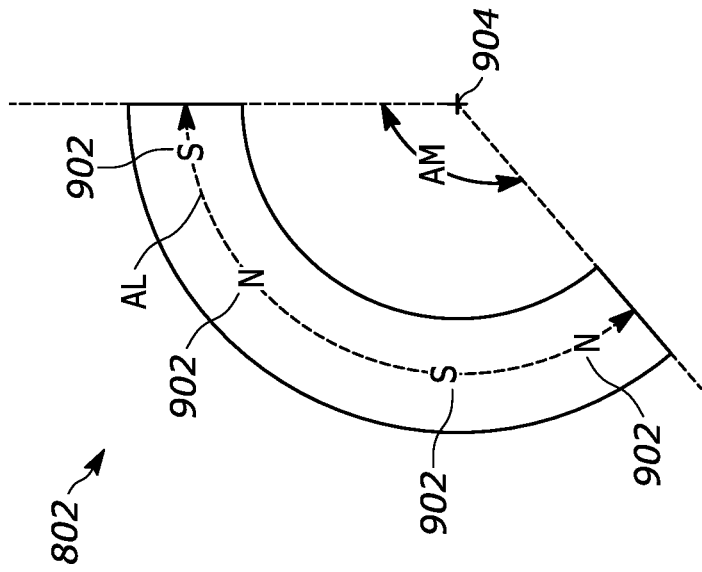
FIG. 9 is a side view of an example magnet that can be used in the magnet assembly of FIG. 8.

Referring now to FIGS. 6 and 7, the end cap assembly 106 can include the braking assembly of the present disclosure. The end cap assembly 106 can include the shell 430, the brake adjustor 202, the brake insert 432 and one or more magnets 434. The shell 430 can be a housing that covers the various elements of the end cap assembly 106. The shell 430 can be formed of any suitable material such as a plastic, composite, alloy or other metal. In the example shown, the shell 430 is formed from a suitable plastic material. The brake adjustor 202 can be the element of the fishing reel 100 that allows a user to adjust the braking force that is exerted on the spool 104. In the example shown, the brake adjustor 202 is a dial that includes a bar of material that can allow a user to manually turn the brake adjustor 202 in the end cap assembly 106.

The brake insert 432 can be mounted in the end cap assembly 106. In the example shown, the brake insert 432 has a rounded or circular outer profile. The brake insert 432, in other examples, can have other outer profiles or shapes. The brake insert 432 can be mounted in the shell 430 such that the brake insert 432 is positioned concentrically with the axis of rotation 402.

The brake insert 432 can include a center ring 610 and a bearing 612. The center ring 610 can be a cylindrical member positioned at the center of the brake insert 432 that can include a central opening. The bearing 612 can be positioned in the central opening of the center ring 610 such that the brake end 426 of the shaft 404 can be inserted into the bearing 612 to support the spool 104 in the cage assembly 102 when the fishing reel 100 is fully assembled. The bearing 612 can be any suitable bearing such as a ball bearing, roller bearing or the like.

The brake insert 432 can also include an annular space positioned between an outer profile of the brake insert 432 and the center ring 610. This annular space can be used to mount the magnet 434 in the end cap assembly 106. The brake insert can also include one or more tabs 608 that can extend radially outward from the outer profile of the brake insert 432. The tabs 608 can engage a groove 436 or other complimentary feature on the cage assembly 102. When the end cap assembly 106 is placed in a mounting position adjacent to the cage assembly 102, the tabs 608 can be received into the grooves 436. The end cap assembly 106 can then be rotated relative to the cage assembly 106 to cause the tabs 608 to move in the grooves 436 behind a retainer to retain the end cap assembly 102 in position on the cage assembly 106. The latch 406 can then be moved to the locked position to retain the end cap assembly 608 in the mounted position.

The brake insert 432 can be made of any suitable material such as a plastic, metal, alloy or composite material. In one example, the brake insert 432 is a cast aluminum material. In another example, the brake insert 432 is molded of a plastic material. In still other examples, other materials can be used.

The brake insert 432 can be mounted in the shell 430 using one or more mounting screws 702. The mounting screws 702 can be inserted through openings in the brake insert 432 and tightened into shell 430. A leaf spring 704, a first cam member 706, a second cam member 708 and cam springs 710 can be positioned between the shell 430 and the brake insert 432. The leaf spring 704 can be positioned in the dial 202 to engage teeth or other toggle features in the shell 430 that can allow the dial 202 to be variably positioned at different rotational positions in the shell 430. The first cam member 706 can include an engagement projection 714 that can be positioned inside a complimentary opening in the dial 202. When the engagement projection 714 is positioned in the complimentary opening in the dial 202, the first cam member 708 will rotate when the dial 202 is rotated.

The second cam member 708 can be operably coupled to the first cam member 706. In the example shown, the first cam member 706 can include a cylindrical boss 716 that projects axially outward from the first cam member 706 in a direction away from the dial 202. The second cam member 708 can include a center aperture (not shown). The center boss 716 can be received in the center aperture of the second cam member 708. In such an arrangement the first cam member 706 and the second cam member 708 are coupled together to maintain a concentric relationship between the members but also allowing the first cam member 706 and the second cam member 708 to move axially relative to each other along the axis of rotation 402. As can be appreciated, in other examples the first cam member 706 and the second cam member 708 can be coupled together using other features or a reverse arrangement from that described above. For example, in other examples, the first cam member 706 and the second cam member 708 can include other posts, stanchions or other arrangements to position the members concentrically to each while permitting axial movement.

When the first cam member 706 and the second cam member 708 are positioned next to each other, a first ramp 720 on the first cam member 706 abuts a second ramp 722 on the second cam member 708. When the dial 202 is rotated, this movement causes the first cam member 706 to rotate due to the engagement projection 714 being positioned in the complimentary opening in the dial 202. This rotation of the first cam member 706 moves the first ramp 720 relative to the second ramp 722 on second cam member 708. The second cam member 708 is prevented from rotating because the second cam member 708 can include pushers 724. The pushers 724 are inserted through openings in the brake insert 432. Since the brake insert 432 is fixed attached to the shell 430 by the fasteners 702, the brake insert cannot rotate and thus the second cam member 708 is prevented from rotating relative to the shell 430. In other examples, the second cam member 708 can include other features to keep the second cam member 708 from rotating relative to the shell 430 such as pins, tabs or the like.

As the first ramp 720 rotates relative to the second ramp 722, the position of the second cam member 708 changes relative to the first cam member 706. As can be appreciated, the ramps 720 and 722 can be positioned on the first cam member 706 and on the second cam member 708 to cause the second cam member 708 to axially move in one direction when the dial 202 is turned clockwise and to move in the opposite axial direction when the dial 202 is turned counterclockwise.

The springs 710 can each be positioned over one of the pushers 724 and between the brake insert 432 and the shell 430. In this position, the springs 710 can bias the second cam member 708 in a direction toward the shell 430. This arrangement maintains the engagement of the engagement projection 714 in the dial 202. Thus when the dial 202 is maintained at a particular rotational position relative to the shell 430, the first cam member 706 and the second cam member 708 are maintained at relative rotational positions.

As previously described, the pushers 724 are positioned in openings in the brake insert 432 and are allowed to extend therethrough. The magnet 434 can be positioned in the brake insert 432 such that the magnet 434 is connected to the second cam member 708. The magnet 432, in the example shown, is fixed to the second cam member 708 by fastening screws 606 through the magnet 432 into the ends of the pushers 724. In other examples, the magnet 432 can be connected to the second cam member 708 using other connectors such as other fasteners or by staking, adhesive, or the like.

As can be appreciated, when the second cam member 708 moves relative to the shell 430 in an axial direction along the axis of rotation 402, the pushers 724 can move axially as well. Thus, the ends of the pushers 724 can move outward from and back towards the brake insert 432. When the ends of the pushers 724 move, the magnet 432 moves as well because the magnet is connected to the second cam member 708. In this manner, when the dial 202 is rotated, the magnet 432 can move in an axial direction in the end cap assembly 106. The magnet 432 can be moved axially toward and away from the spool 104 when the dial 202 is rotated.

Figure 8:
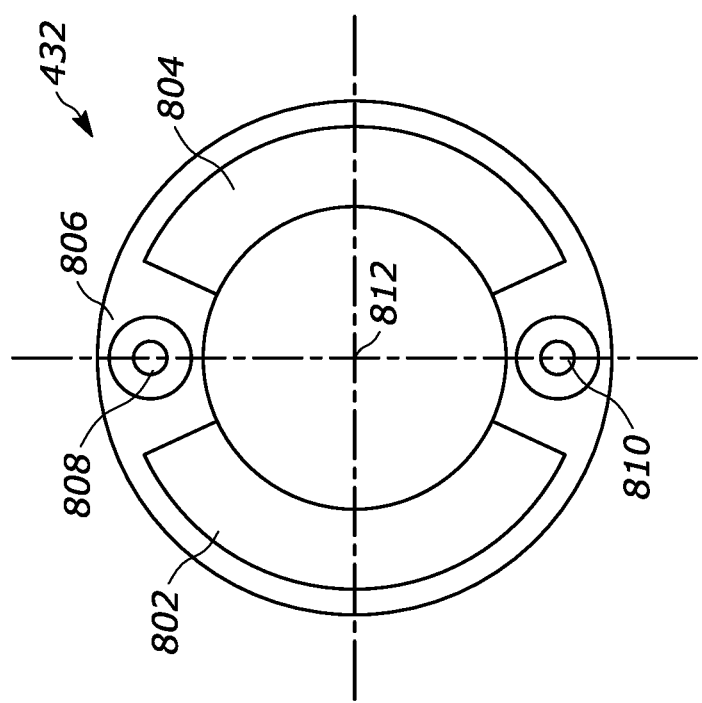
FIG. 8 is a side view of an example magnet assembly that can be used in a braking assembly in accordance with the present disclosure.

As shown in FIG. 8, the magnet 432 can include a first arcuate magnet 802 and a second arcuate magnet 804. In other examples, the magnet 432 can include an annular magnet. In the example shown, the first magnet 802 and the second magnet 804 can be mounted in a magnet ring 806. The magnet ring 806 can be made of plastic or other suitable material that can be formed to receive the first arcuate magnet 802 and the second arcuate magnet 804. The first magnet 802 and the second magnet 804 can be retained in the magnet ring 806 using tabs, an interference fit, adhesive or other suitable attachment. The magnet ring 806 can serve to locate the first magnet 802 and the second magnet 804 in a desired position when the magnet ring 806 is mounted in the end cap assembly 106. As described above, the magnet ring 806 can be mounted in the end cap assembly 106 by securing screws 606 through the openings 808, 810 and into the ends of the pushers 724 of the second cam member 708. In such a position, a center 812 of the magnet ring 806 is aligned with the axis of rotation 402 (see e.g., FIG. 7). The first magnet 802 and the second magnet 804 can be positioned in the magnet ring 806 such that the first magnet 802 and the second magnet 804 can be positioned concentrically with the axis of rotation 402 around the center 412.

Each of the first magnet 802 and the second magnet 804 can be similarly constructed and configured to have similar magnetic properties and a similar shape. The first magnet 802 is shown and described but it should be appreciated that the second magnet 804 can have a similar shape and similar construction. In the example shown, the first magnet 802 has an arcuate shape such that the magnet 802 has a shape of a ring having a center 904 with a desired inner and outer diameter. The magnet 802, however, does not have to be a full ring but can only be a portion of the full ring having an arc length AL as shown. The arc length AL can be defined by an arc measure AM. In various examples, the arc length AL of the magnet 802 can have various lengths defined by various arc measures AM. In one example, the magnet 802 can have an arc length AL defined by an arc measure AM of at least about 90°. In another example, the magnet 802 can have an arc length AL defined by an arc measure AM of at least about 120°. In yet another example, the magnet 802 can have an arc length AL defined by an arc measure AM of about 130°. In still other examples, the magnet 802 can have other arc lengths AL defined by other arc measures AM.

As further shown, the magnet 802 is a single continuous magnet having multiple magnetic poles 902 positioned along the length of the magnet. The term continuous as used in relation to the magnet 802 means that the magnet is constructed as a single element and is not made from multiple individual pieces connected together used adjacent to one another. In this example, the magnet 802 (and the magnet 804) can be cast, sintered, machined or otherwise formed to have the arcuate shape. As further shown, the magnet 802 can have four magnetic poles. The magnet can include poles having alternating polarities along its length. In the example shown, the magnetic poles 902 can be evenly spaced along the length of the magnet 802. In other examples, the magnet 802 can include other arrangements of magnetic poles 902 and other quantities of magnetic poles 902.

The magnet 802 can be any suitable magnet prepared from suitable material to induce a magnetic flux to exert a braking force on the spool 104 when the spool 104 rotates in the fishing reel 100 relative to the magnet 802. In one example, the magnet 802 is a Nd—Fe—B or neodymium magnet. In other examples, other types of magnets can be used.

As previously explained, the magnets 802 and 804 can be mounted in the magnet ring 806 that is coupled to the second cam member 708. When the fishing reel 100 is fully assembled, the magnet ring 806 is positioned in the end cap assembly 106 on a side of the fishing reel 100 opposite the crank assembly 108. When the spool 104 spins in the cage assembly 102 during a cast, the spool 104 rotates. A braking force is exerted on the spool 104 by the magnets 802, 804 that can slow the rotational velocity of the spool 104 when the spool 104 spins. The braking force is exerted on a braking surface of the spool 104 that can be located on the second end portion 418. The magnets 802, 804 can be oriented in a plane that is substantially perpendicular to the axis of rotation. The braking surface can also be located in a plane that is substantially perpendicular to the axis of rotation or on a surface that is angled relative to the axis of rotation as previously described. The braking force that is exerted on the spool 104 can be adjusted by varying the distance of the magnets 802, 804 from the spool 104 by turning the dial 202 that, in turn, moves the first cam member 720 and the second cam member 722. This can then adjust the distance of the magnets 802, 804 from the spool 104. In this manner, the rotational velocity of the spool 104 can be slowed during casting to prevent backlash that can cause tangled fishing lines and unsatisfactory casting distances and casting accuracy.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fishing reel comprising:
a cage assembly defining an opening;
a spool positioned in the opening of the cage assembly and operable to rotate about an axis of rotation;
a crank coupled to the cage assembly and operable to rotate the spool when the crank is rotated; and
a braking assembly removably positioned on a side of the cage assembly opposite to the crank, the braking assembly including at least one magnet, the magnet having an arcuate shape that spans a braking arc length concentric with the axis of rotation, the braking arc length defined by an arc measure of at least about 90°, wherein:
the spool comprises a brake engagement surface, the brake engagement surface oriented substantially perpendicular to the axis of rotation of the spool and located on a side of the spool away from the crank and adjacent to the braking assembly; and
the rotation of the spool is slowed by a braking force induced on the brake engagement surface by the magnet in the braking assembly when the spool rotates about the axis of rotation.

2. The fishing reel of claim 1, wherein the magnet is a single continuous member.

3. The fishing reel of claim 1, wherein the magnet includes at least one positive magnetic pole and at least one negative magnetic pole on a side of the magnet facing the spool.

4. The fishing reel of claim 1, wherein the braking assembly includes at least two magnets, each magnet having an arcuate shape that spans a braking arc length concentric with the axis of rotation, and each braking arc length is defined by an arc measure of at least about 90°.

5. The fishing reel of claim 1, wherein the spool comprises an aluminum material surface that is engaged by a braking force exerted on the aluminum material surface when the spool rotates relative to the magnet.

6. The fishing reel of claim 1, wherein the braking assembly comprises a brake control, the brake control including a cam that is configured to move the magnet axially toward and away from the spool along the axis of rotation.

7. The fishing reel of claim 1, wherein:
the cage assembly includes a latch operable in a locked mode and an unlocked mode, the locked mode preventing removal of the braking assembly from the cage assembly and the unlocked mode allowing removal of the braking assembly from the cage assembly; and
the latch configured to manually move from the locked mode to the unlocked mode without a tool.

8. The fishing reel of claim 1, wherein the braking assembly includes a spool support configured to support an end of the spool and to locate the spool concentrically with respect to the magnet.

9. The fishing reel of claim 1, wherein the magnet includes at least four magnetic poles distributed evenly along the braking arc length.

10. The fishing reel of claim 1, wherein the braking arc length is defined by an arc measure of at least about 120°.

11. The fishing reel of claim 1, wherein the braking arc length is defined by an arc measure of about 130°.

12. The fishing reel of claim 1, wherein:
the spool comprises a collection portion positioned between opposing end portions, the opposing end portions having diameters greater than a diameter of the collection portion to retain a length of fishing line on the collection portion; and
the magnet is disposed adjacent at least one of the end portions to exert a braking force on the at least one end portion.

13. The fishing reel of claim 12, wherein the magnet is positioned axially separated from the collection portion.

14. The fishing reel of claim 13, wherein the braking assembly comprises a cam configured to adjustably move the magnet axially toward and away from the at least one end portion.

15. A fishing reel comprising:
a cage assembly defining an opening;
a spool positioned in the opening of the cage assembly and operable to rotate about an axis of rotation;
a crank coupled to the cage assembly and operable to rotate the spool when the crank is rotated; and
a braking assembly removably positioned on a side of the cage assembly opposite to the crank, the braking assembly including at least one magnet, the magnet having an arcuate shape that spans a braking arc length concentric with the axis of rotation, the braking arc length defined by an arc measure of at least about 90°,
wherein the magnet includes at least one positive magnetic pole and at least one negative magnetic pole on a side of the magnet facing the spool.

16. A fishing reel comprising:
a cage assembly defining an opening;
a spool positioned in the opening of the cage assembly and operable to rotate about an axis of rotation;
a crank coupled to the cage assembly and operable to rotate the spool when the crank is rotated; and
a braking assembly removably positioned on a side of the cage assembly opposite to the crank, the braking assembly including at least one magnet, the magnet having an arcuate shape that spans a braking arc length concentric with the axis of rotation, the braking arc length defined by an arc measure of at least about 90°,
wherein the magnet includes at least four magnetic poles distributed evenly along the braking arc length.

* * * * *